Figure 1:
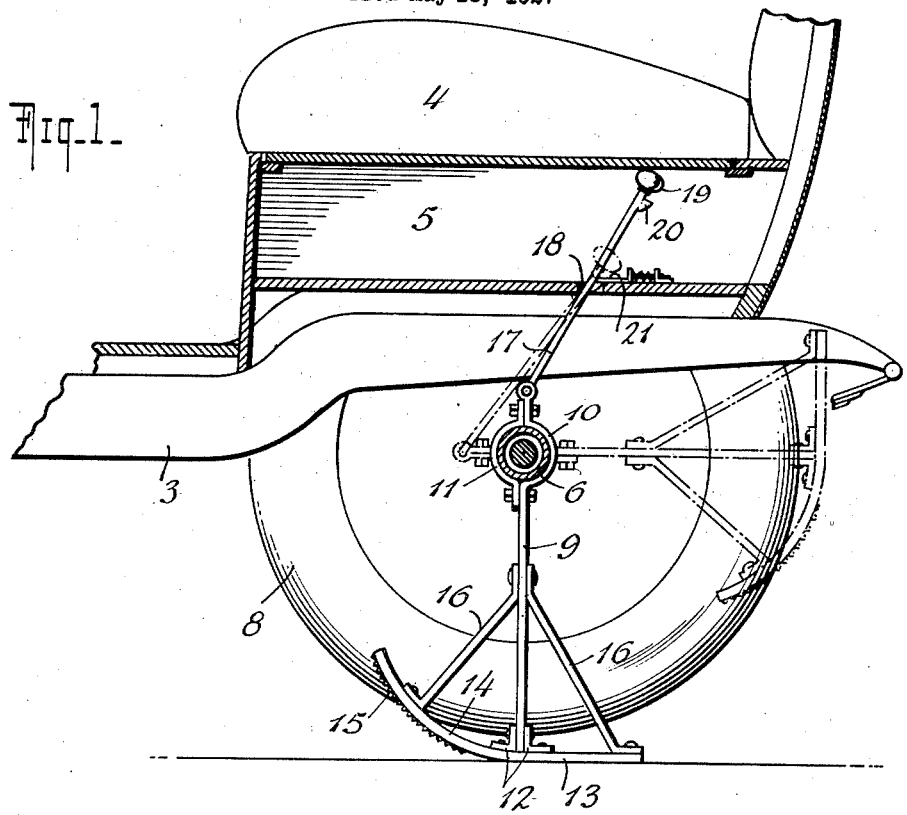

Sept. 4, 1928.

S. M. SALKIND

VEHICLE JACK

Filed May 18, 1927

1,682,856

INVENTOR
SAMUEL M. SALKIND
BY Richards & Geier
ATTORNEYS

Patented Sept. 4, 1928.

1,682,856

UNITED STATES PATENT OFFICE.

SAMUEL M. SALKIND, OF BROOKLYN, NEW YORK.

VEHICLE JACK.

Application filed May 18, 1927. Serial No. 192,208.

This invention relates to improvements in jacks, especially for use on motor vehicles, and has for one of its objects to provide a jack of simple, practical and inexpensive construction which may be permanently fixed to the axle of the vehicle and readily and quickly adjusted to operative and inoperative positions in such manner as to avoid the necessity of the operator reaching under the car to effect the adjustments.

The above and other objects will appear more clearly from the following detail description, when taken in connection with the accompanying drawing, which illustrate a preferred embodiment of the inventive idea.

In the drawing—

Figure 2:
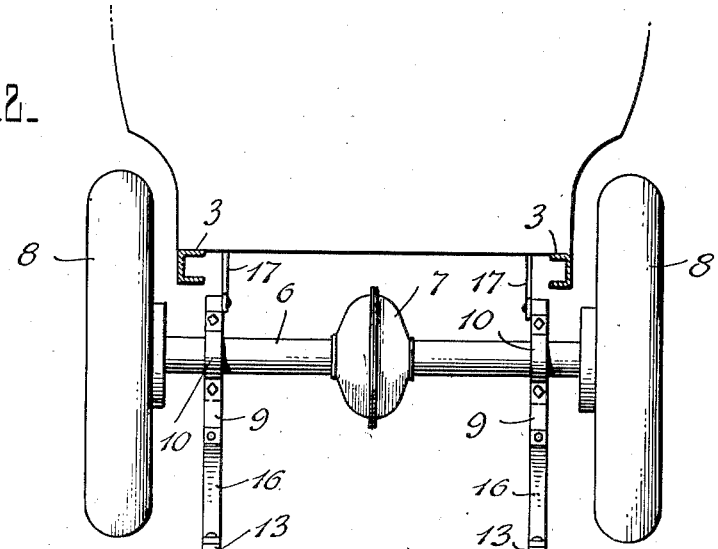

Figure 1 is a fragmentary sectional view through the vehicle showing a jack applied to the axle both in its operative and inoperative positions; and Figure 2 is a rear elevation of the apparatus in operated position.

Referring more particularly to the accompanying drawing, the numeral 3 indicates the chassis of a motor vehicle which supports the rear seat 4 having the usual compartment 5 beneath the same. The chassis also carries the rear axle housing 6 including the differential casing 7.

The jack of the present invention is designed to be supported directly from the axle housing 6 and in order that both the rear wheels 8 of the vehicle may be elevated there are provided two of the jacks, one on each side of the casing 7. As both of the jacks are of the same construction a description of one will suffice for purposes of the present invention.

Each jack comprises a standard 9 one end of which is bent to provide a semi-circular section 10 with which cooperates a similar section 11 secured to the standard and combining with the section 10 to form a collar which loosely embraces the axle housing so as to permit of a rotary movement of the standard with respect to the axle. At the free end of the standard the same has secured thereto by means of angle irons 12 the shoe 13, one end 14 of which is curved and provided upon its outer surface with the serrations 15 which form a gripping surface when in contact with the ground. The shoe 13 is braced by the diagonal braces 16 secured to the shoe and to an intermediate portion of the standard 9.

The other extremity of the standard 9, which extends on the opposite side of the axle housing, has pivotally connected thereto one end of an operating rod 17 which projects through the opening 18 in the bottom of the compartment 5 and is provided on its free end with a handle 19 adjacent which is located a lug 20. In order to operate the jack it is only necessary to remove the rear seat 4 to gain access to the compartment 5 whereby the handle 19 may be grasped. When the jack is to be placed in its inoperative or elevated position the same is swung upwardly and rearwardly to the dotted line position shown in Figure 1, at which time the operating rod 17 is depressed and the lug 20 thereof is engaged with a spring pressed latch 21 secured to the bottom of the compartment. To move the jack to its operative position the latch 21 is disengaged from said lug and the rod 17 thereupon pulled upwardly toward its full line position. This operation swings the jack downwardly until the serrated surface 15 thereof engages the ground, at which time the jack assumes a diagonal position. The vehicle is then moved slightly backwards to cause a rocking movement of the jack and axle about the curved end of the shoe 13 until the standard of the jack has reached the vertical position shown in Figure 1, whereupon the wheel adjacent the jack will be elevated from the ground with the rear end of the shoe 13 in contact with the supporting surface and preventing any further rearward movement of the vehicle.

What is claimed is:

The combination with a vehicle including an axle housing, and a seat for the vehicle having a compartment therein; of a jack including a standard having a collar loosely embracing said axle housing for rotary movement thereabout, a supporting shoe carried by the standard and engageable with a supporting surface when the standard is in a vertical position to elevate said axle housing, an operating rod connected to said standard for moving the same about said housing, said rod extending into the compartment of said seat, and a latching device within said compartment engageable with said rod to hold the same in one of its actuated positions.

In testimony whereof I have affixed my signature.

SAMUEL M. SALKIND.